US008665367B2

(12) United States Patent
Pan et al.

(10) Patent No.: US 8,665,367 B2
(45) Date of Patent: Mar. 4, 2014

(54) VIDEO RESOLUTION ENHANCEMENT TECHNIQUE (75) Inventors: Hao Pan, Camas, WA (US); Yeping Su, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 648 days.

(21) Appl. No.: 12/657,865

(22) Filed: Jan. 29, 2010

(65) Prior Publication Data

US 2011/0187934 A1 Aug. 4, 2011

(51) Int. Cl.
*H04N 7/01* (2006.01)
*H04N 11/20* (2006.01)

(52) U.S. Cl.
USPC ........... 348/441; 348/445; 348/446; 348/448; 348/450; 348/451; 348/452; 348/456; 348/458; 348/317; 348/180; 345/698; 382/199; 382/298; 382/299

(58) Field of Classification Search
USPC ......... 348/441, 445, 448, 450, 458, 452, 446, 348/456, 451, 317, 180; 382/199, 298, 299; 345/698
See application file for complete search history.

(56) References Cited

U.S. PATENT DOCUMENTS

| | | | | |
|---|---|---|---|---|
| 5,661,525 | A * | 8/1997 | Kovacevic et al. | 348/452 |
| 6,985,187 | B2 * | 1/2006 | Han et al. | 348/452 |
| 7,477,802 | B2 * | 1/2009 | Milanfar et al. | 382/299 |
| 7,548,276 | B2 * | 6/2009 | Mizuhashi et al. | 348/459 |
| 2003/0118096 | A1 * | 6/2003 | Ishtiaq et al. | 375/240.1 |
| 2006/0165301 | A1 * | 7/2006 | Cha et al. | 382/240 |
| 2006/0245495 | A1 * | 11/2006 | Han et al. | 375/240.13 |
| 2006/0262976 | A1 * | 11/2006 | Hart et al. | 382/190 |
| 2009/0028464 | A1 | 1/2009 | Pan | |
| 2009/0245373 | A1 * | 10/2009 | Tourapis et al. | 375/240.15 |
| 2009/0268823 | A1 * | 10/2009 | Dane et al. | 375/240.27 |
| 2009/0310675 | A1 * | 12/2009 | Adachi et al. | 375/240.12 |
| 2010/0231593 | A1 * | 9/2010 | Zhou et al. | 345/428 |
| 2010/0272184 | A1 * | 10/2010 | Fishbain et al. | 375/240.16 |
| 2011/0194612 | A1 * | 8/2011 | Tsai | 375/240.16 |

FOREIGN PATENT DOCUMENTS

| | | |
|---|---|---|
| JP | 08-336046 A | 12/1996 |
| JP | 2007-226656 A | 9/2007 |
| JP | 2008-293185 A | 12/2008 |
| JP | 2009-093442 A | 4/2009 |
| JP | 2009-290793 A | 12/2009 |

OTHER PUBLICATIONS

International Search Report, dated Sep. 28, 2010 in co-pending International App. No. PCT/JP2010/061357, filed Jun. 28, 2010; 7 pages.

* cited by examiner

*Primary Examiner* — Jefferey Harold
*Assistant Examiner* — Mustafizur Rahman
(74) *Attorney, Agent, or Firm* — Chernoff Vilhauer McClung & Stenzel, LLP (57) ABSTRACT A method for increasing the resolution of a frame of a video includes receiving at least three frames of the video and compensating for the motion of a portion of at least two of the frames with respect to another one of the frames. After the motion compensation, spatially processing each of the frames of the video to increase the resolution of each of the at least three frames of the video. After the spatial processing, temporally processing at least three frames to determine the increased resolution of the frame of the video, wherein the frame is one of the at least three frames of the video.

9 Claims, 13 Drawing Sheets

VIDEO RESOLUTION ENHANCEMENT TECHNIQUE

CROSS-REFERENCE TO RELATED APPLICATIONS

Not applicable.

BACKGROUND OF THE INVENTION

The present invention relates generally to increasing the resolution of video content.

A video stream may have a different resolution than the display resolution, which is typically higher than the video stream. In order to properly display the video on the higher resolution display, the resolution of the video is enhanced in some manner. Typically, the enhancement is performed by modeling the temporal characteristics of the video in order to enhance the resulting video. Unfortunately, the temporal modeling of the video stream is computationally complex and unsuitable for low complexity computational systems with minimal memory.

The foregoing and other objectives, features, and advantages of the invention will be more readily understood upon consideration of the following detailed description of the invention, taken in conjunction with the accompanying drawings.

DETAILED DESCRIPTION OF PREFERRED EMBODIMENT

Figure 1:
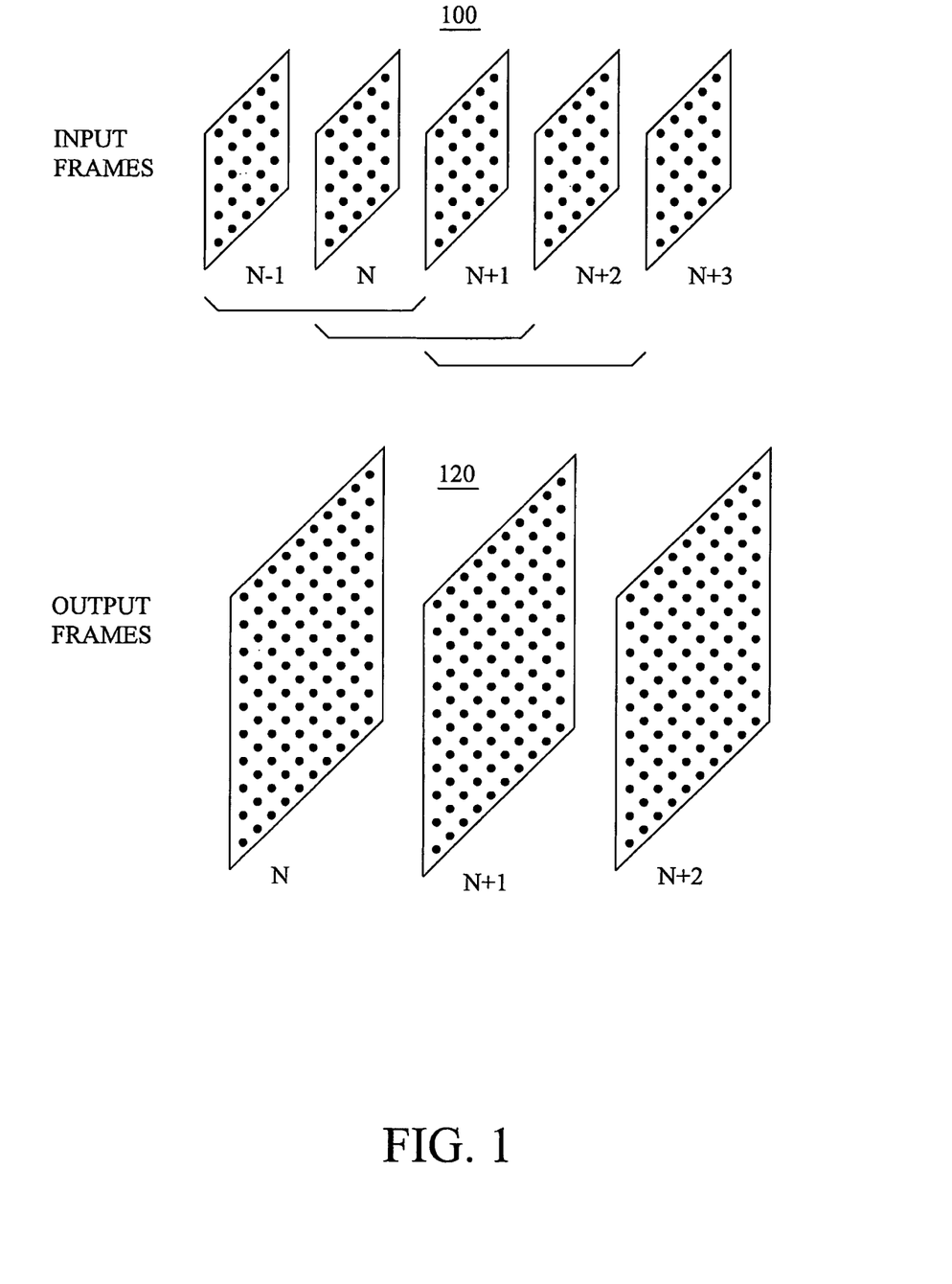
FIG. 1 illustrates a sequential series of frames.

Referring to FIG. 1, a video typically comprises a series of frames 100. The frames may be coded in any manner, such as for example, intra coded frames, forwardly predicted frames, backwardly predicted frames, or otherwise. For reference the current frame may be n, with the previous frame being n−1, the next frame being n+1, the subsequent frame being n+2, and so forth. The preferred technique uses three frames in order to determine frame n, namely the current frame, the previous frame, and the subsequent frame, to achieve a two times spatial resolution increase of the current frame. The additional frames n+1 and n−1 include complimentary and redundant information that may be used for increasing the resolution and attenuating the noise in the current frame. The result is a series of frames 120 with increased resolution.

Figure 2:
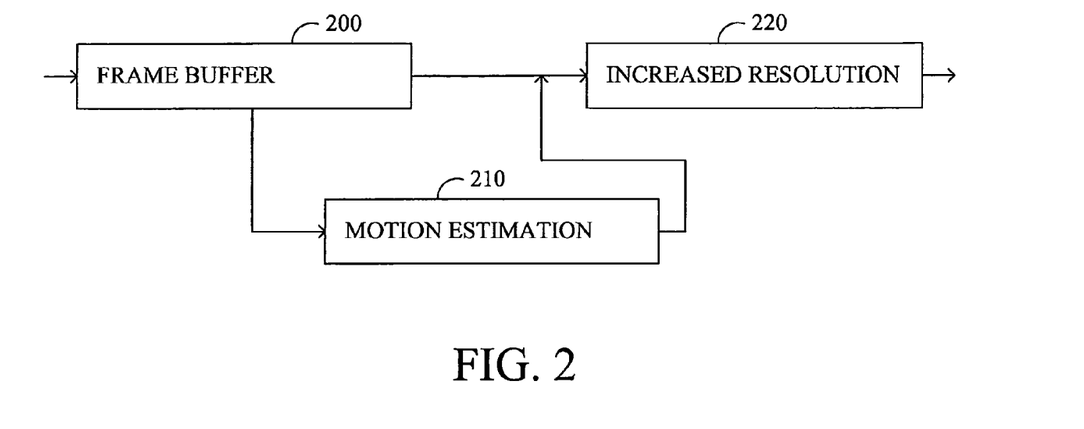
FIG. 2 illustrates a resolution framework.

Referring to FIG. 2, a frame buffer 200 is used to store multiple frames used in processing for increasing the resolution of the frame. Motion estimation 210 estimates the location of a pixel or region relative to another one in different frames. Based upon multiple frames, together with motion estimation, an increased resolution 220 is determined for a frame.

Figure 3:
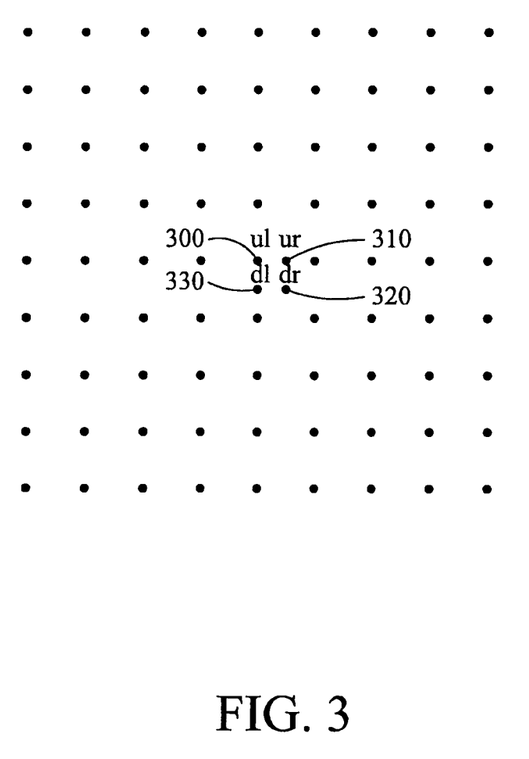
FIG. 3 illustrates increased spatial resolution.

Referring to FIG. 3, the input to the technique preferably includes three input frames, namely, n−1, n, and n+1 (other frames and/or number of frames may likewise be used). The output based upon these three frames is a single frame with twice the resolution (or other suitable resolution) of the input frame at time n. In the preferred embodiment the spatial scaling factor of the technique is two, namely, an input spatial resolution of M×N is modified to an output spatial resolution of 2M×2N. Referring to FIG. 3, the preferred arrangement of the output pixels with respect to the input pixels is shown. For each pixel of the input image, a set of four output pixels are generated, which are indexed by ul 300, ur 310, dl 320, and dr 330, respectively. The output pixel ul 300 is co-sited with an input pixel, while output pixels ur 310, dl 320, and dr 330 are half-input-pixel off from the input pixel either horizontally and/or vertically.

Figure 4:
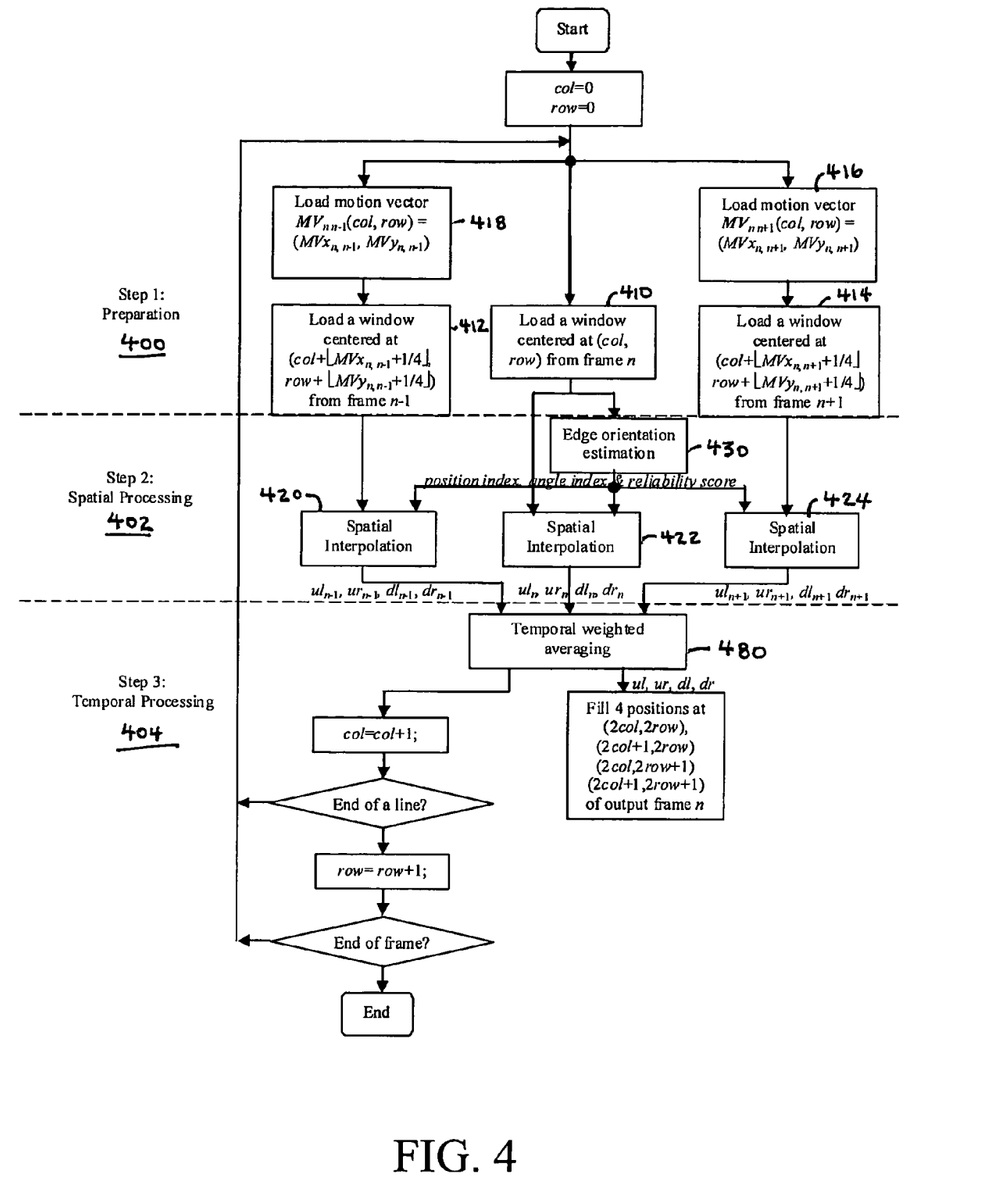
FIG. 4 illustrates a flow chart for resolution enhancement.

Referring to FIG. 4, a system for increasing the resolution of a frame of video is illustrated. In general, the system uses a spatial-temporal processing technique, namely, initially performs spatial processing followed by temporal processing. The spatial processing interpolates new pixels within each frame independently by two times. The temporal processing then processes the interpolated pixels in a temporal manner.

The first step 400 loads one window from the current frame 410 and two corresponding windows 412 and 414 from the previous and next frames n−1 and n+1, respectively. The loading of window from frame n and the loading of the windows from frames n−1 or n+1 are different because the latter are compensated based upon motion estimation. For frame n, a window with center pixel at position (col, row) in the input frame n is loaded, and the output pixel position ul is at the center of the window. For frame n+1, the window is supposed to be loaded with its center that shifts from (col, row) by motion vector, $MV_{n,n+1}(col,row) = (MVx_{n,n+1}(col,row), MVy_{n,n+1}(col,row))$ 416, to $(col+MVx_{n,n+1}, row+MVy_{n,n+1})$ in frame n+1. However, because motion vectors are preferably at quarter-pixel accuracy, $MV_{n,n+1}(col,row)$ may be fractional numbers, which makes the window center not at the input pixel grids of input frame n+1. Therefore, the technique instead preferably loads the window centered at input pixel position $(col+\lfloor MVx_{n,n+1}+\frac{1}{4}\rfloor, row+\lfloor MVy_{n,n+1}+\frac{1}{4}\rfloor)$ where $\lfloor \cdot \rfloor$ represents a flooring function.

For frame n−1, the window is supposed to be loaded with its center that shifts from (col,row) by motion vector, $MV_{n,n-1}(col,row) = (MVx_{n,n-1}(col,row), MVy_{n,n-1}(col,row))$ 418, to $(col+MVx_{n,n-1}, row+MVy_{n,n-1})$ in frame n−1. However, because motion vectors are preferably at quarter-pixel accuracy, $MV_{n,n-1}(col,row)$ may be fractional numbers, which makes the window center not at the input pixel grids of input frame n−1. Therefore, the technique instead preferably loads the window centered at input pixel position $(col+\lfloor MVx_{n,n-1}(col,row)+\frac{1}{4}\rfloor, row+\lfloor MVy_{n,n-1}(col,row)+\frac{1}{4}\rfloor)$ where $\lfloor \cdot \rfloor$ represents a flooring function.

Figure 5A:
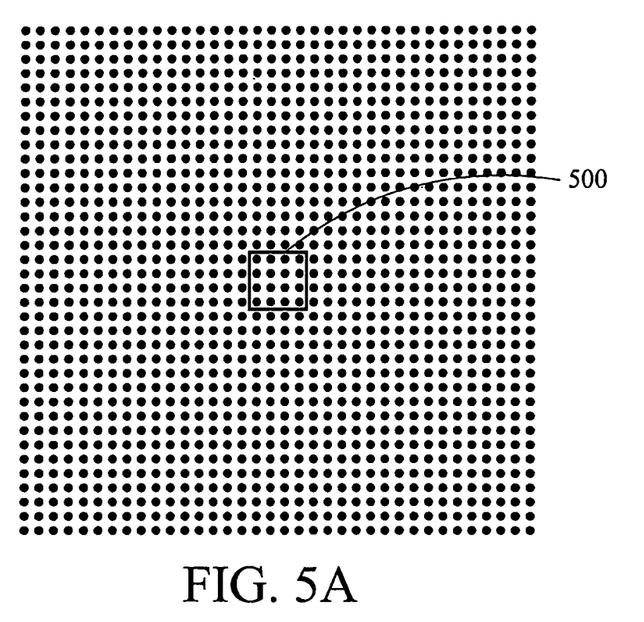
FIGS. 5A-5D illustrate potential positions for spatial interpolation.
Figure 5B:
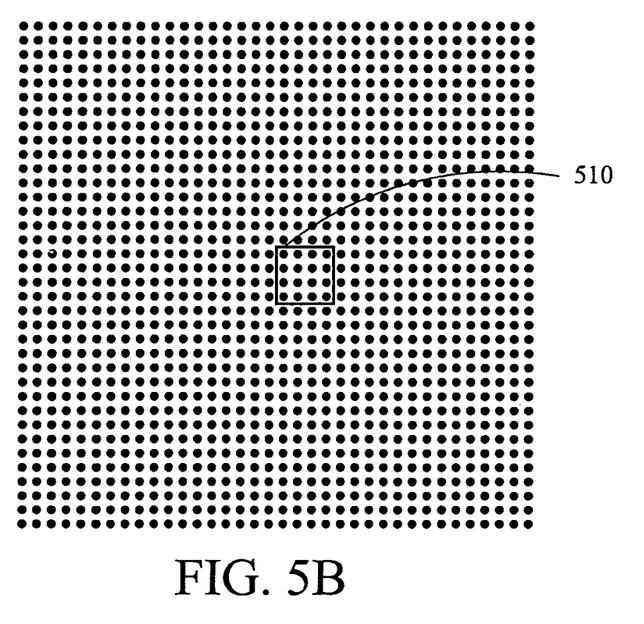
Figure 5C:
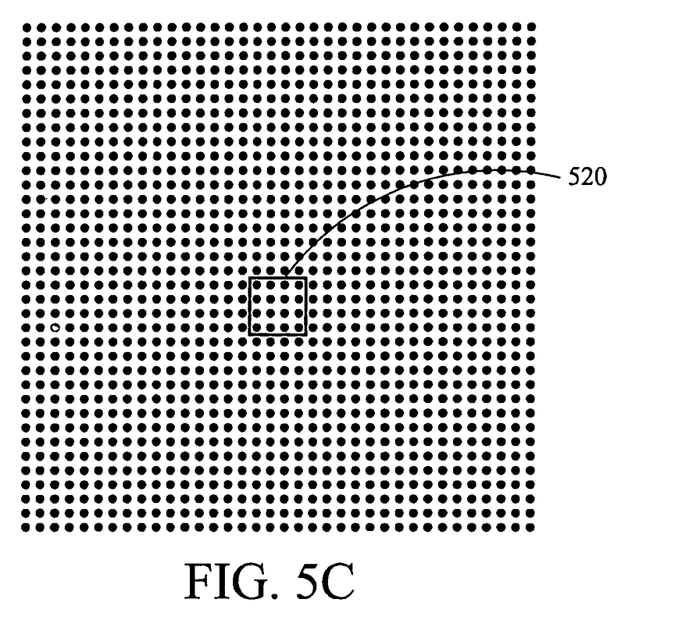
Figure 5D:
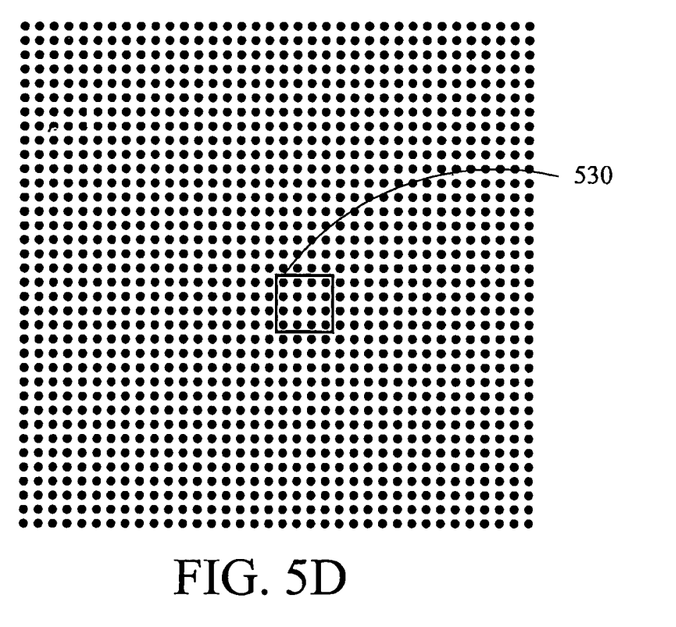

The output pixel position ul is preferably still at the motion compensated position $(col+MVx_{n,n+1}, j+MVy_{n,n+1})$ for frame n+1 and $(col+MVx_{n,n-1}, row+MVy_{n,n-1})$ for frame n−1, because maintaining the interpolation pixels from all three aligned frames reduces generating artifacts and/or blurriness. As a result, ul does not always site at the window centers at $(col+\lfloor MVx_{n,n+1}(col,row)+\frac{1}{4}\rfloor, row+\lfloor MVy_{n,n+1}+\frac{1}{4}\rfloor)$ for frame n+1 or $(col+\lfloor MVx_{n,n-1}(col,row)+\frac{1}{4}\rfloor, row+\lfloor MVy_{n,n-1}(col,row)+\frac{1}{4}\rfloor)$ for frame n−1. More specifically, the quarter pixel accuracy of the motion vectors makes ul have 16 possible locations around the window center in a window from frame n+1 or n−1, and these locations 500 are illustrated in FIG. 5(a). Accordingly, the remaining three output pixel positions ur, dl, and dr have 16 possible locations as well, which are illustrated at locations 510 (see FIG. 5(b), 520 (see FIG. 5(c), and 530 (see FIG. 5(d), respectively. These 16 possible locations of output pixel positions {ul,ur,dl,dr} are indexed, and the position index is fed to the spatial interpolation modules.

After selecting the windows, the system then spatial processes 402 the pixels. The spatial process is applied to each of the three windows separately to generate their own respective interpolated pixels at the output pixel positions of {ul,ur,dl,dr}. Preferably, the window loaded from frame n−1 generate {$ul_{n-1}, ur_{n-1}, dl_{n-1}, dr_{n-1}$} 420; the window loaded from frame n generates {$ul_n, ur_n, dl_n, dr_n$} 422; and the window loaded from frame n+1 generates {$ul_{n+1}, ur_{n+1}, dl_{n+1}, dr_{n+1}$} 424.

To improve the rendering of the images, the edge information in the images should be preserved in the up-conversion technique. When an edge is determined, the technique should interpolate new pixels generally along the direction of the edge, but not generally across the edge. This directional edge based interpolation improves the quality of the resulting image. The edge orientation is estimated for the three windows of the spatial processing 402. For short temporal time periods, the technique may be simplified by presuming that (1) the motion compensation may successfully sufficiently align the same object across different frames with quarter pixel accuracy, and (2) the motion of the objects is sufficiently translational within the three frames. With such presumptions, the three windows may have sufficiently similar edge orientation. As a result, instead of estimating edge orientation three times independently in all three windows, the technique preferably only estimates edge orientation 430 for a single window, such as the window in frame n.

The output of the edge orientation estimation 430 may be an angle index and a reliability score $\alpha$ of the estimation. The reliability score $\alpha$ may be a scalar between 0 and 1, in which 0 refers to totally not reliable and 1 refers to totally reliable. The orientation may be quantized into a set of angles, such as −45 degrees, −26.6 degrees, −18.4 degrees, 0 degrees, 18.4 degrees, 26.6 degrees, 45 degrees, 63.4 degrees, 71.6 degrees, 90 degrees, 108.4 degrees, and 116.6 degrees. Other edge based techniques may likewise be used.

The spatial interpolation modules 420, 422, and 424 use the edge orientation information. FIG. 7(a) through FIG. 7(l) illustrate the preferred different edge orientations. The input of the edge orientation estimation 430 includes, (1) the loaded windows; (2) interpolation position index (0-15 as previously discussed where the output pixel positions in the windows from frames n−1 and n+1 may be off from the window center due to quarter pixel accuracy of motion vectors, where the interpolation position indexes the position in the window), and (3) the angle index (0-11), and (4) a reliability $\alpha$ score (0-1).

Figure 6:
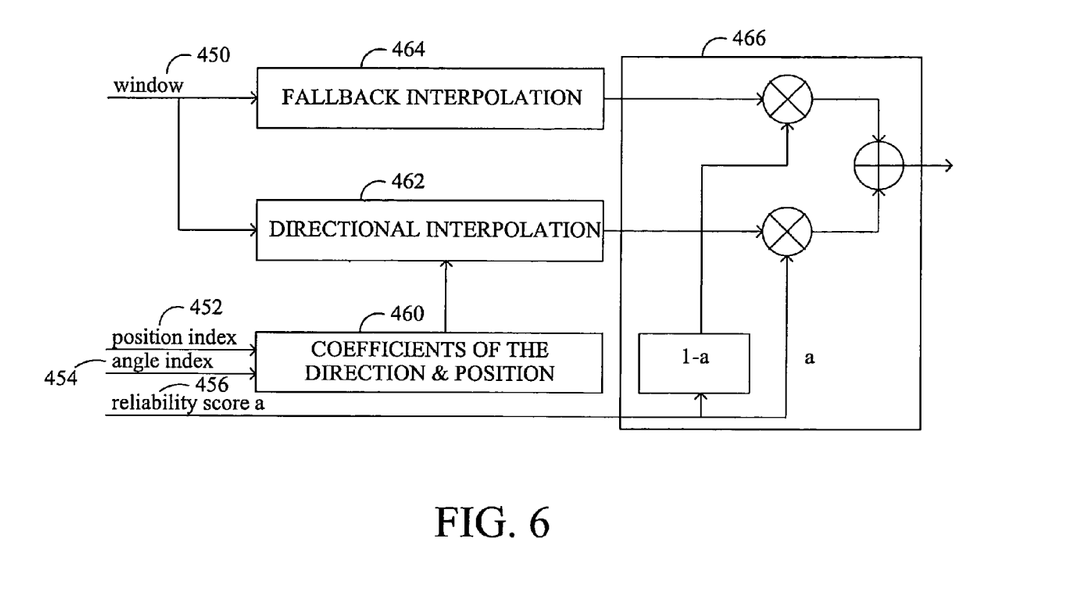
FIG. 6 illustrates a block diagram for spatial interpolation.
Figure 7A:
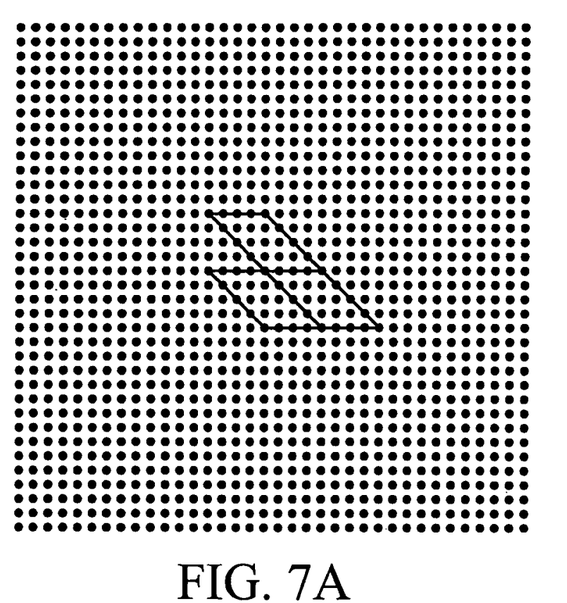
FIGS. 7A-7L illustrate edge orientations.
Figure 7B:
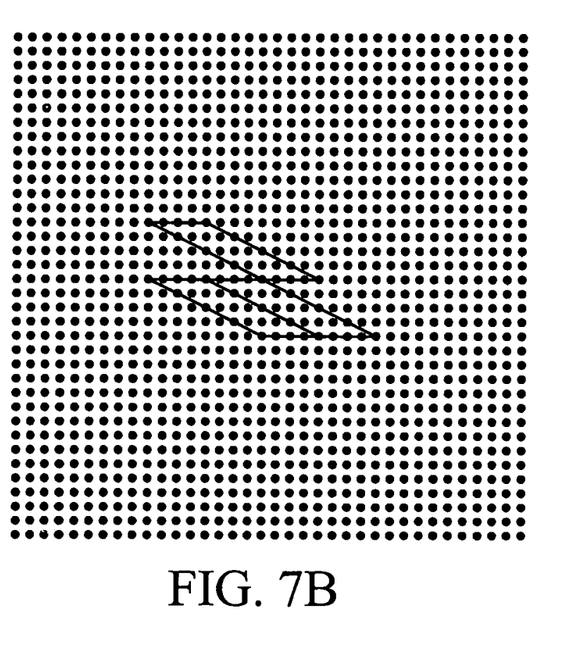
Figure 7C:
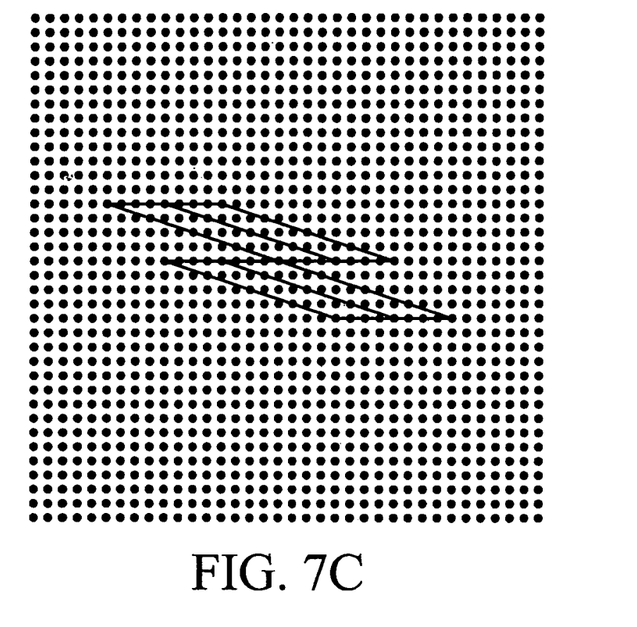
Figure 7D:
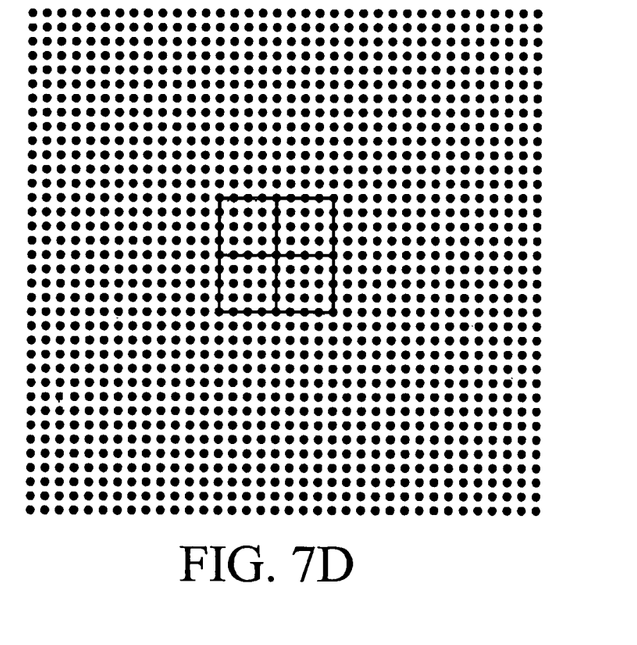
Figure 7E:
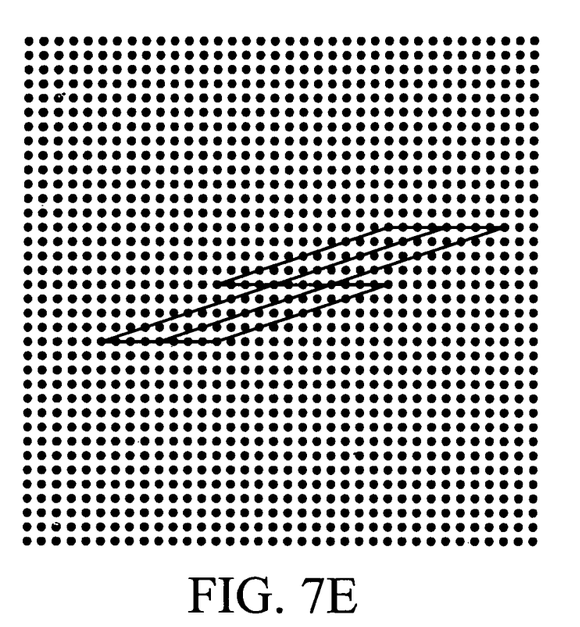
Figure 7F:
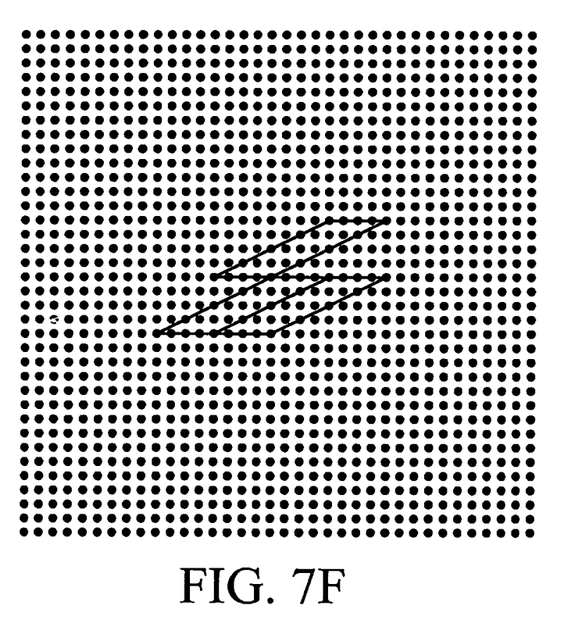
Figure 7G:
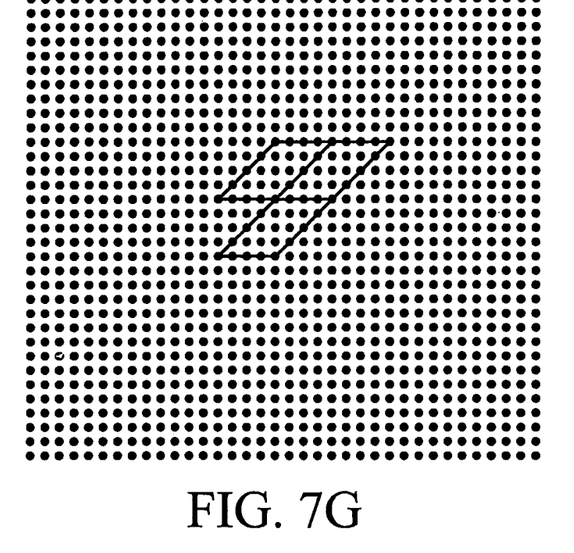
Figure 7H:
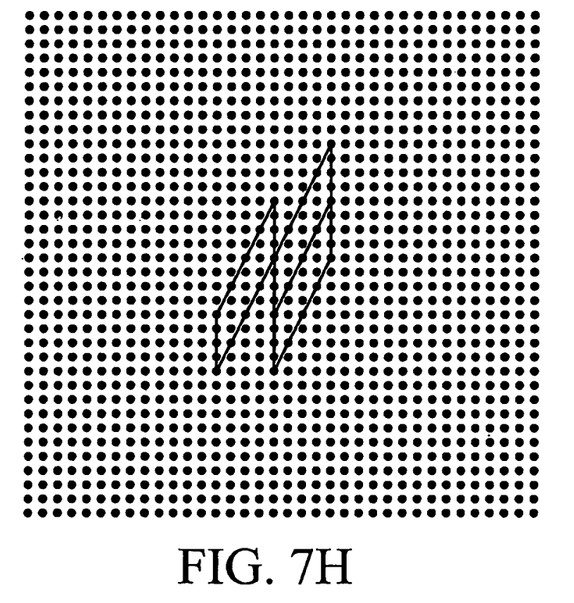
Figure 7I:
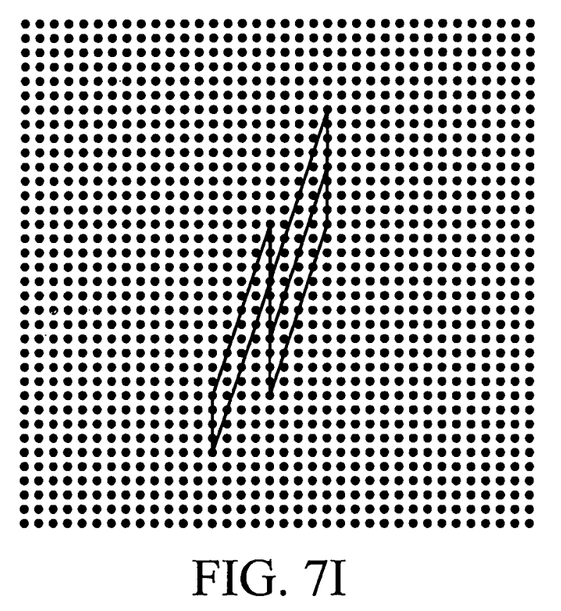
Figure 7J:
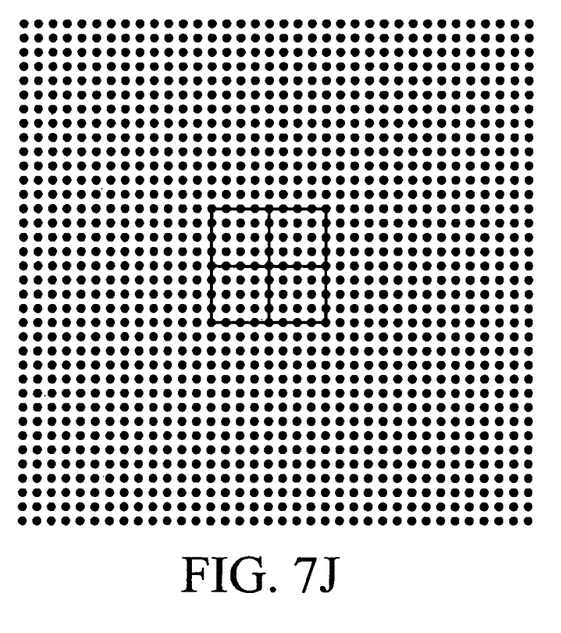
Figure 7K:
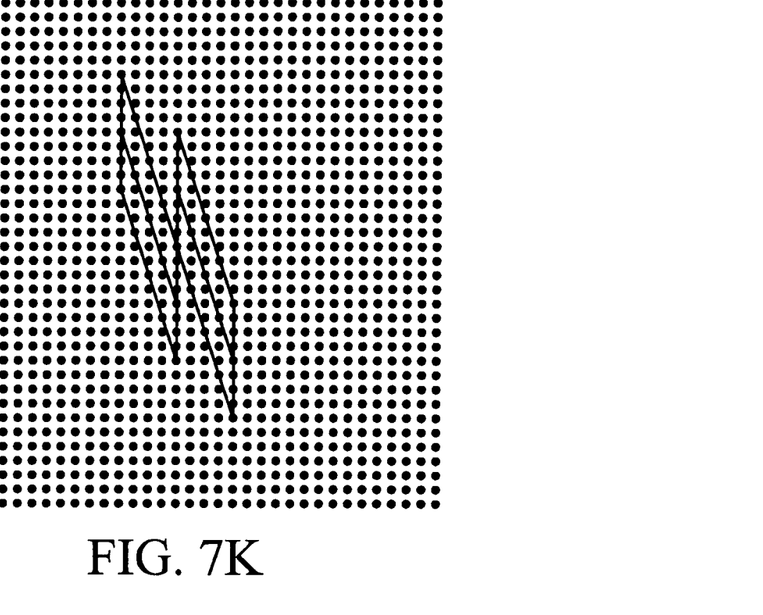
Figure 7L:
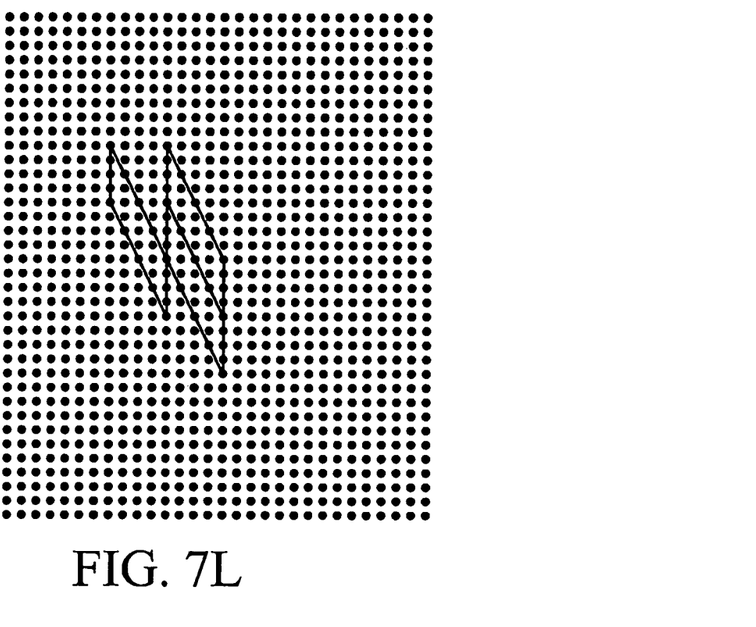

Referring to FIG. 6, the spatial interpolation 420, 422, 424 receives the respective window 450, and receives the position index 452, the angle index 454, and the reliability score 456. Based upon this data the coefficients of the direction and position are determined 460. Based upon the direction and position 460 a directional interpolation technique 462 is performed. In the event directional interpolation is not that effective or otherwise not known with a sufficient degree of certainty, a fallback interpolation 464, such as averaging, is performed. The reliability score $\alpha$ is used to blend 466 the fallback interpolation 464 and the directional interpolation 462.

By way of example, for each of the 12 edge angles, each of the 16 locations, ul is put into a parallelogram or a square with four input pixels as the four corners of the parallelogram or square. The system first picks the preferred parallelogram based on the input interpolation position index and angle index. Then the pixel value at ul is a weighted average of the pixel values of the four corners. The weights are determined by the distances from ul to the four corners. The same technique is applied to the other output pixel positions ur, dl, and dr.

As a result of the spatial processing, the pixels of the frames n−1 and n+1 that are spatially co-sited with frame n, are likewise determined if needed. In some cases, this would be pixels with half-pixel spatial resolution. Thus, for subsequent processing, the pixels of frame n−1, n, and n+1 would all be spatially consistent with one another.

After spatial processing 402, a temporal processing 404 may be performed. Preferably a weighted temporal averaging 480 is applied to the three sets of interpolated new pixels. An exemplary expression for the weighted average is as follows.

At a temporal processing step 404 weighted temporal averaging is applied to the three sets of interpolated new pixels. One expression for determining the value is as follows:

$$ul = (w_{n-1} \cdot ul_{n-1} + ul_n + w_{n+1} \cdot ul_{n+1})/(w_{n-1} + 1 + w_{n+1})$$

$$ur = (w_{n-1} \cdot ur_{n-1} + ur_n + w_{n+1} \cdot ur_{n+1})/(w_{n-1} + 1 + w_{n+1})$$

$$dl = (w_{n-1} \cdot dl_{n-1} + dl_n + w_{n+1} \cdot dl_{n+1})/(w_{n-1} + 1 + w_{n+1})$$

$$dr = (w_{n-1} \cdot dr_{n-1} + dr_n + w_{n+1} \cdot dr_{n+1})/(w_{n-1} + 1 + w_{n+1})$$

Temporal weights $w_{n-1}$ and $w_{n+1}$ are used to adjust for inaccuracies and errors in motion vectors (e.g., due to occlusions), which could lead to blur and other artifacts. $w_{n-1}$ and $w_{n+1}$ are based on the accuracy of the motion vectors $MVx_{n,n-1}$ and $MVx_{n,n+1}$. The accuracy is assessed by using a mean square error ("MSE") of the displaced frame difference between a window centered at the current pixel (col,row) in frame n and a window centered at (col+$MVx_{n,n+1}$,j+$MVy_{n,n+1}$) for frame n+1 and (col+$MVx_{n,n-1}$,row+$MVy_{n,n-1}$) for frame n−1. More specifically:

$$MSE_{n,n-1}(\text{col, row}) = \frac{1}{(2d+1)^2} \sum_{s=col-d}^{col+d} \sum_{t=row-d}^{row+d} (I_n(s,t) - I_{n-1}(s + MVx_{n,n-1}(\text{col, row}), t + MVy_{n,n-1}(\text{col, row})))^2$$

$$MSE_{n,n+1}(\text{col, row}) = \frac{1}{(2d+1)^2} \sum_{s=col-d}^{col+d} \sum_{t=row-d}^{row+d} (I_n(s,t) - I_{n+1}(s + MVx_{n,n+1}(\text{col, row}), t + MVy_{n,n+1}(\text{col, row})))^2$$

More precisely accurate motion vectors ($MVx_{n,n-1}$) and ($MVx_{n,n+1}$) should make the MSE smaller. Such MSE are then convertible to weights $w_{n-1}$, and $w_{n+1}$ through a monotonically decreasing function. As one embodiment using an exponential function, the filter weights may be as follows:

$$w_{n-1} = \exp\left(-\frac{MSE_{n,n-1}(\text{col, row})}{2\sigma_t^2}\right)$$

$$w_{n+1} = \exp\left(-\frac{MSE_{n,n+1}(\text{col, row})}{2\sigma_t^2}\right)$$

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A method for increasing the resolution of a target frame of a video comprising:
   (a) receiving at least three frames of said video;
   (b) compensating for the motion of a portion of at least two of said at least three frames with respect to another one of said frames;
   (c) after said motion compensation, spatially processing each of said at least three frames of said video to: (i) calculate edge information indicative of the direction of any edges in at least one of said at least three frames; and (ii) increase the vertical and horizontal resolution of each of said at least three frames of said video, where said edge information is used to increase the resolution of each of said at least three frames;
   (d) after said spatial processing, temporally processing said at least three frames to determine the increased resolution of said target frame of said video.

2. The method of claim 1 wherein said frames are sequential.

3. The method of claim 2 wherein said frame of said video is a central frame of a series of said at least three said sequential frames.

4. The method of claim 3 wherein said motion compensation has at least % pixel accuracy.

5. The method of claim 1 wherein said spatial processing estimates values generally aligned with said edge estimation.

6. The method of claim 5 wherein said edge estimation for said spatial processing is based upon a single edge estimation.

7. The method of claim 6 wherein said temporal processing is based upon an average.

8. The method of claim 7 wherein said average is a weighted average.

9. The method of claim 8 wherein said increased resolution is 2× a horizontal direction and 2× in a vertical direction.

* * * * *

UNITED STATES PATENT AND TRADEMARK OFFICE
CERTIFICATE OF CORRECTION

PATENT NO. : 8,665,367 B2 Page 1 of 1
APPLICATION NO. : 12/657865
DATED : March 4, 2014
INVENTOR(S) : Hao Pan and Yeping Su

It is certified that error appears in the above-identified patent and that said Letters Patent is hereby corrected as shown below:

In the Claims:

Col. 6, Line 7

Change  "has at least % pixel accuracy" to read –has at least ¼ pixel accuracy–.

Signed and Sealed this
Fifteenth Day of July, 2014

Michelle K. Lee
*Deputy Director of the United States Patent and Trademark Office*